(12) United States Patent
Weakley

(10) Patent No.: US 8,925,824 B2
(45) Date of Patent: Jan. 6, 2015

(54) RADIO FREQUENCY IDENTIFICATION (RFID) ANTENNA WITH TUNING STUBS FOR MOUNT ON METAL RFID TAG

(76) Inventor: Thomas Craig Weakley, Simpsonville, SC (US)

( * ) Notice: Subject to any disclaimer, the term of this patent is extended or adjusted under 35 U.S.C. 154(b) by 245 days.

(21) Appl. No.: 12/877,879

(22) Filed: Sep. 8, 2010

(65) Prior Publication Data

US 2011/0057043 A1    Mar. 10, 2011

Related U.S. Application Data

(60) Provisional application No. 61/241,303, filed on Sep. 10, 2009.

(51) Int. Cl.
| | | |
|---|---|---|
| G06K 19/06 | (2006.01) | |
| G06K 19/077 | (2006.01) | |
| H01Q 1/22 | (2006.01) | |
| H01Q 9/26 | (2006.01) | |
| H01Q 9/28 | (2006.01) | |

(52) U.S. Cl.
CPC .... G06K 19/07749 (2013.01); G06K 19/07771 (2013.01); H01Q 1/2225 (2013.01); H01Q 9/26 (2013.01); H01Q 9/285 (2013.01)

USPC .......................................... 235/492; 235/494

(58) Field of Classification Search
USPC ............... 235/439, 492, 441, 451; 340/572.1, 340/572.5
See application file for complete search history.

(56) References Cited

U.S. PATENT DOCUMENTS

| | | | |
|---|---|---|---|
| 6,249,227 B1* | 6/2001 | Brady et al. | 340/572.1 |
| 6,275,157 B1* | 8/2001 | Mays et al. | 340/572.5 |
| 2003/0169207 A1* | 9/2003 | Beigel | 343/718 |
| 2004/0036659 A1* | 2/2004 | Langley et al. | 343/713 |
| 2007/0146210 A1* | 6/2007 | Hilgers | 343/702 |
| 2007/0199989 A1* | 8/2007 | Piety et al. | 235/438 |
| 2010/0095522 A1* | 4/2010 | Lerch et al. | 29/832 |
| 2010/0123635 A1* | 5/2010 | Lopez et al. | 343/722 |

* cited by examiner

*Primary Examiner* — Sonji Johnson

(57) ABSTRACT

A Radio Frequency Identification (RFID) device can comprise a dielectric separator and a RFID antenna with a RFID chip region. The antenna can have a main section and at least two tuning stubs that fold back from areas on the main section of the RFID antenna which are away from the RFID chip connection region back towards the RFID chip antenna region. The tuning stubs can be spaced away from the main section.

23 Claims, 3 Drawing Sheets

RADIO FREQUENCY IDENTIFICATION (RFID) ANTENNA WITH TUNING STUBS FOR MOUNT ON METAL RFID TAG

BACKGROUND

Tracking assets utilizing Radio Frequency Identification (RFID) technology is well known, similarly it is well known that metal surfaces interfere with the functionality of any RFID tags mounted thereon. This is because the electric field boundary condition requires that the electric field component of the propagating electromagnetic energy evanesce in close proximity to the metallic surface. Thus the fabrication of an effective passive (e.g. powered by the incident electromagnetic field energy) RFID tag for Mount on Metal (MoM) applications presents a technical challenge. Further, it is advantageous for the operation of a RFID tracking system to reduce the overall size of the tag, i.e. its physical footprint on the asset.

Two approaches are known in the art for overcoming the technical hurdle for a MoM tag. The first is to provide a standoff or physical separator between the metallic surface and a RFID tag designed to function in free air, remote from any absorbing or reflecting surfaces. In the absence of the standoff, the tag does not function when mounted on the surface. It is also well known that the selection of standoff materials can significantly influence the performance of the MoM tag. A well-known approach is to use a material that is an efficient absorber of Electro-Magnetic (EM) energy as the spacer. Were the material a perfect absorber the tag would function just as it could in free air, since there would be no interaction of the metallic surface with the field in the vicinity of the tag.

Another approach that has been attempted is the use of a "patch" antenna. In this case the tag antenna incorporates a solid conductive ground plane at a fixed distance from the radiating element of the antenna. There is fixed impedance (through the RFID chip) between the ground plane and the radiating element. The shape and size of the radiating element is manipulated together with the separation between the ground plane and the radiating element. In this case the metallic ground plane serves as a reflector for EM energy; this property also affects the radiation pattern of the tag, significantly increasing the directionality of radiation, away from the ground plane. There have been attempts to utilize the metallic surface as a ground plane; however this is not generally the preferred approach, owing to inconsistency in coupling to the metallic surface and the variability of conductivity of the surface itself (copper vs. aluminum vs. steel) which may vary widely by material.

Both approaches are valid in terms of improving the performance of the tag in proximity to a metal surface; however, neither adequately addresses the issue of size reduction of the tag. For the patch antenna, it is possible to decrease the size of the radiating surface by using a ceramic material with a high dielectric constant as the spacer between the ground plane and the radiating surface. However tags of this design are expensive to produce, owing to the high cost of the ceramic material relative to polymeric or epoxy-glass composite materials used in circuit boards.

DETAILED DESCRIPTION OF THE INVENTION

Figure 1:
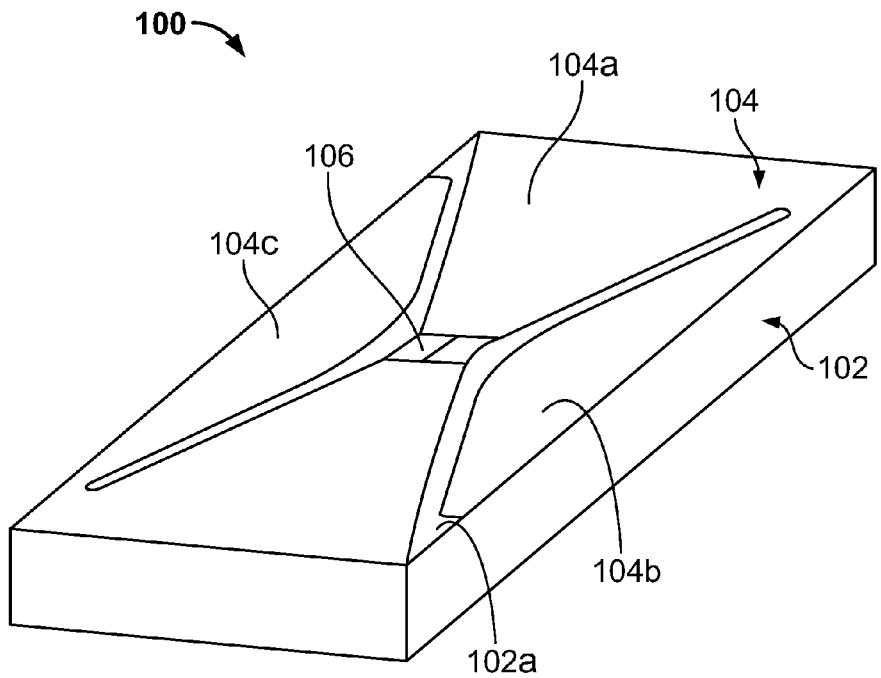
FIG. 1 illustrates a mount on metal tag showing a "S" configuration of tuning stubs, distal to connections between radiating surface, upper surface in the figure perpendicular to the Z-axis, and ground plane.

One embodiment of the present invention is a Radio Frequency Identification (RFID) device comprising a dielectric separator 102 and a RFID antenna 104. The RFID antenna 104 has a connection region 106 to connect to a RFID chip. The RFID antenna 104 can wrap around the dielectric separator 102.

The RFID antenna 104 has a main section 104a and at least two tuning stubs 104b and 104c that fold back from areas on the main section 104a of the RFID antenna 104 which are away from the RFID chip connection region back towards the RFID chip connection region 106. The tuning stubs 104b and 104c are spaced away from the main section 104a.

The main section 104a of the RFID antenna 104 can expand in V-shapes from the RFID chip connection region 106 on a first surface 102a of the dielectric separator 102. The tuning stubs 104b and 104c can fill in some of the space not filled by the V-shapes of the main section on the first surface 102a.

The tuning stubs 104b and 104c can be mostly triangular. In one embodiment, ends of the tuning stubs 104b and 104c do not extend to a point.

The tuning stubs 104b and 104c can be largely symmetrical on the first surface 102a of the dielectric separator 102.

As shown in FIG. 1, the tuning stubs 104b and 104c can extend from opposite sides of the first surface 102a to form an "S"-Shaped configuration.

Figure 2:
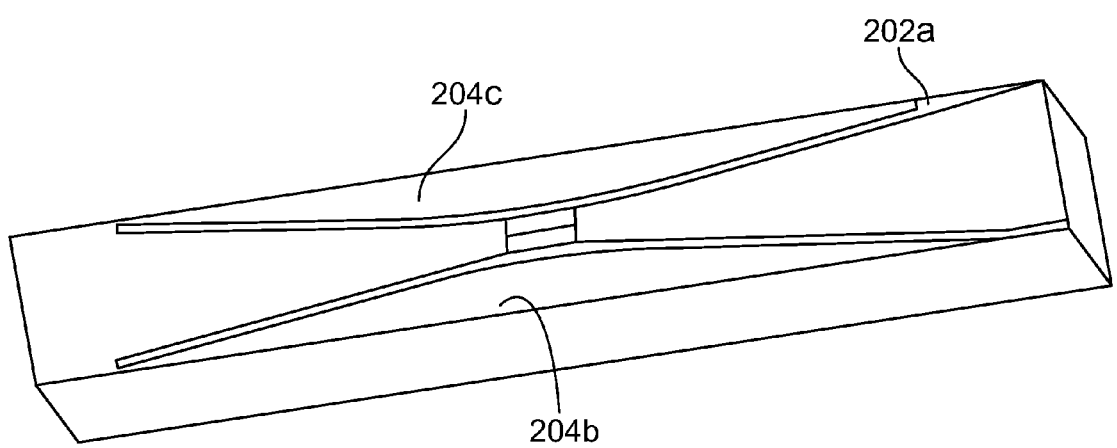
FIG. 2 illustrates a mount on metal tag showing an "E" configuration of tuning stubs, distal to one connection between radiating surface and, upper surface in the figure perpendicular to the Z-axis and ground plane.

As shown in FIG. 2, the tuning stubs 204b and 204c can extend from a same side of a first surface 202a to form an "E"-Shaped configuration.

A RFID chip (not shown) can be connected to the RFID chip connection region 106. Further, the RFID tag can be encapsulated and attached to an object with an adhesive.

The RFID device can be part of a wristband. This can improve the read range for the RFID wristbands. RFID wristbands typically have short read ranges because the human body has high absorption (and some conduction) at around the 900 MHz range. The use of the present system allows for the antenna to be tuned for use as part of a wristband for users.

The RFID device can be a Mount on Metal (MoM) RFID device.

The tuning stubs can be designed to operate with different frequency ranges using the same sized dielectric separator. The specific operating frequency range can be set by the design of the tuning stubs. Tuning can be done by adding or removing portions of the tuning stub design.

The tuning stubs can be designed such that the RFID device can be used with different tagged objects using the same sized dielectric separator by designing the tuning stubs such that the RFID device works with the different tagged objects.

The RFID device can be part of a family of RFID device designs, with each RFID device design of the family, using the same sized dielectric separator. The members of the family can have different antenna response characteristics. Each design of the family can have a different tuning stub design.

In one embodiment, a novel configuration of antenna is used in which the single connection between the radiating element and the ground plane is replaced by multiple connections configured in a symmetrical arrangement with respect to the RFID chip. The impedance of the radiating surface can be changed by manipulating the geometry of the radiating surface. Tuning of the antenna, matching of the tag resonant frequency with reader operating frequency and maximizing of the response can be accomplished though placement of tuning stubs which fold back the distal from the connections between the radiating surface and the ground plane. These tuning stubs can significantly improve the antenna response while maintaining the geometric constraints imposed by the small size of the tag. Moreover, the configuration proposed herein allows for use of low dielectric constant materials such as circuit board material, FR4 fiberglass composites, and polymeric films.

Figure 3:
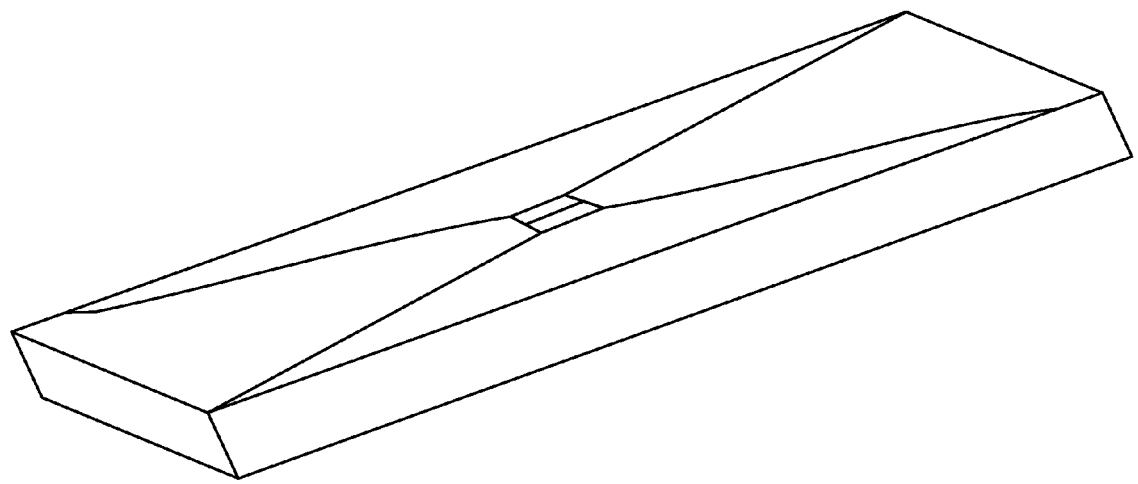
FIG. 3 illustrates a mount on metal tag showing an "O" configuration without tuning stubs, upper surface in the figure perpendicular to the Z-axis.

FIG. 3 illustrates a Mount on Metal (MoM) tag showing an "O" configuration without tuning stubs.

Figure 4:
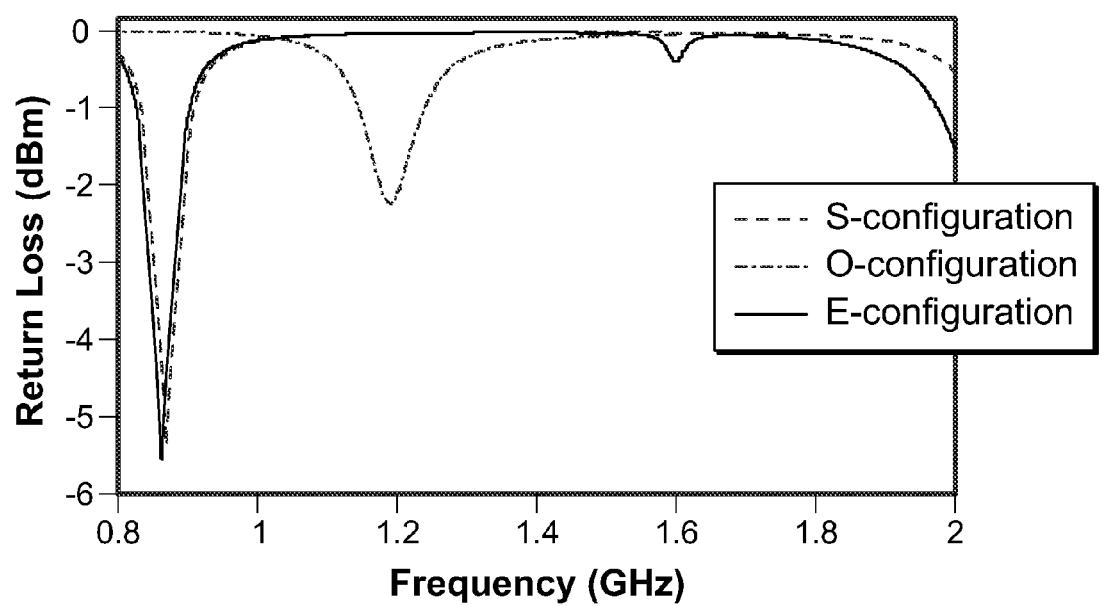
FIG. 4 illustrates a response characteristic of the three tag geometries of FIGS. 1-3.

From the results plotted in FIG. 4 above it is apparent that the addition of the tuning stubs significantly enhances the performance of the tag, with respect to the decrease in return loss, increase in tag sensitivity to RF field excitation, and shift of the resonant frequency of the tag to the range 868-880 MHz (European band).

Figure 5:
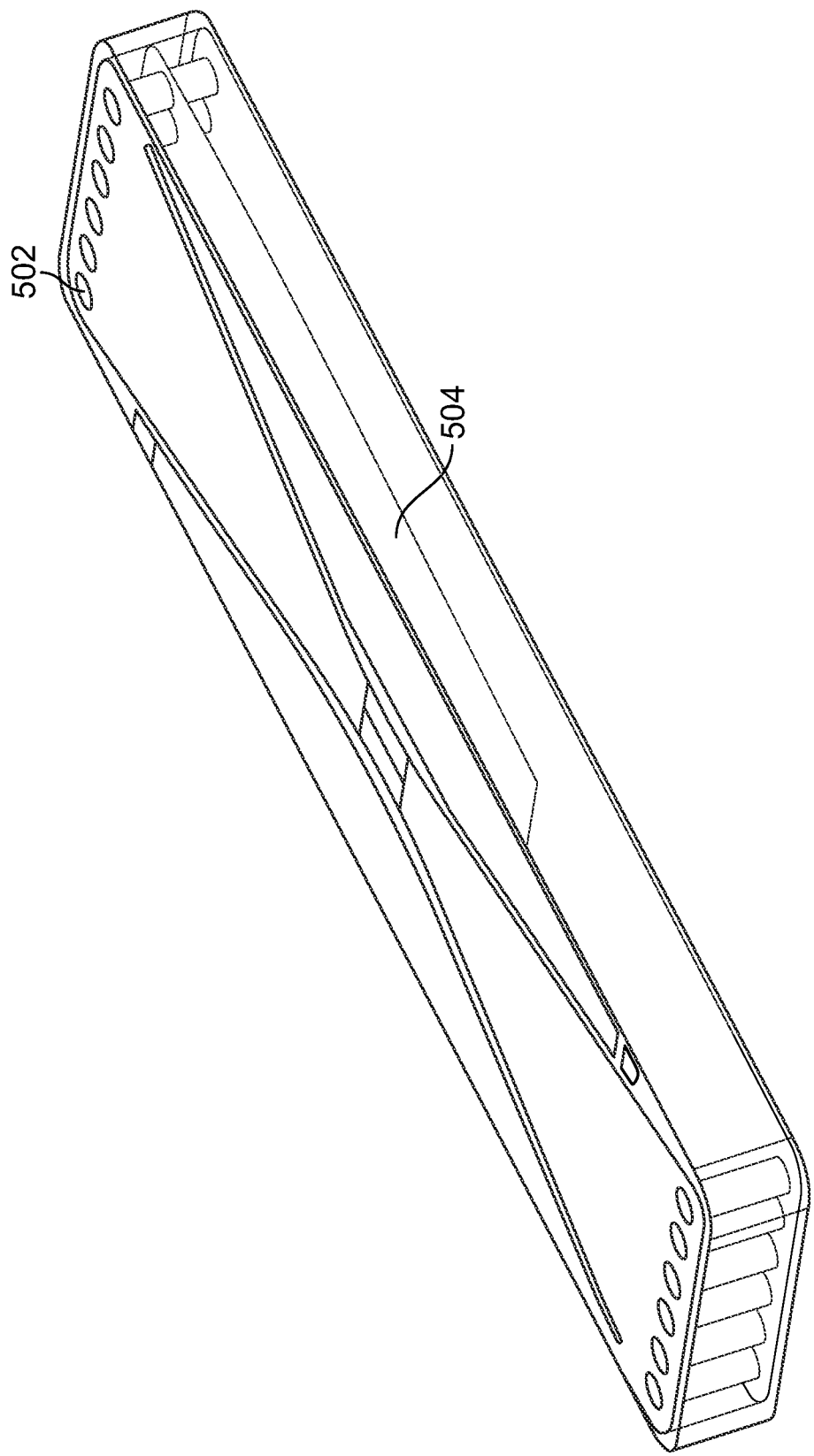
FIG. 5 illustrates an alternative embodiment using through holes and an inner conductive layer.

FIG. 5 shows an embodiment, with a tag constructed with through holes 502 using a circuit board construction, rather than having the conductive element wrap around the end of the dielectric spacer. The separator can have one or more conducting layers 504 parallel to the top and bottom surfaces of the tag. The inner layer 504 allows the overall tag to be thinner.

The foregoing descriptions of preferred embodiments of the present invention have been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A Radio Frequency Identification (RFID) device comprising:
a dielectric separator;
a RFID antenna with a RFID chip connection region to connect to a RFID chip on the dialectic separator;
wherein the RFID antenna has a main conductive section and at least two tuning stubs that fold back from areas on the main conductive section of the RFID antenna which are away from the RFID chip connection region back towards the RFID chip connection region; and
wherein a first of the at least two tuning stubs directly connects to the main section at a first location away from the RFID chip connection region and a second of the at least two tuning stubs directly connects to the main conductive section at a second location away from the RFID connector region.

2. The RFID device of claim 1, wherein the main conductive section of the RFID antenna expands in V-shapes from the RFID chip connection region on a first surface of the dielectric separator.

3. The RFID device of claim 2, wherein the tuning stubs fill in some of the space not filled by the V-shapes of the main section on the first surface.

4. The RFID device of claim 1, wherein the tuning stubs are mostly triangular.

5. The RFID device of claim 4, wherein far ends of the tuning stubs do not extend to a point.

6. The RFID device of claim 1, wherein the tuning stubs are largely symmetrical on a first surface of the dielectric separator.

7. The RFID device of claim 1,
wherein the tuning stubs extend from opposite sides of a first surface.

8. The RFID device of claim 1, wherein the tuning stubs extend from a same side of a first surface.

9. The RFID device of claim 1 further comprising:
the RFID chip connected to the RFID chip connection region.

10. The RFID device of claim 9,
wherein the RFID device is part of a wristband.

11. The RFID device of claim 1,
wherein the RFID device is a Mount on Metal (MoM) RFID device.

12. The RFID device of claim 1,
wherein tuning stubs can be designed to operate with different frequency ranges using the same sized dielectric separator; and
wherein the specific frequency range is set by the design of the tuning stubs.

13. The RFID device of claim 1,
wherein the tuning stubs are such that the RFID device can be used with different tagged objects using the same sized dielectric separator by designing the tuning stubs such that the RFID device works with the different tagged objects.

14. The RFID device of claim 1,
wherein the RFID device is part of a family of RFID device designs, each RFID device design of the family using the same sized dielectric separator; and
wherein members of the family having different antenna response characteristics.

15. The family of RFID devices of claim 14,
wherein each design of the family has a different tuning stub design.

16. The RFID device of claim 1,
wherein the dielectric separator is made of a low dielectric constraint material.

17. The RFID device of claim 16,
wherein the dielectric separator is made of circuit board material, FR4 fiber glass composites or polymeric films.

18. The RFID device of claim 1,
wherein the dielectric separator has one or more conducting layers parallel to the top and bottom surfaces of the dielectric separator.

19. The RFID device of claim 1,
wherein the RFID antenna wraps around the dielectric separator.

20. The RFID device of claim 1,
wherein the RFID antenna connects two sides of the dielectric separator using through holes.

21. The RFID device of claim 1, wherein the main section of the RFID antenna includes first and second V-shaped regions.

22. The RFID device of claim 21, wherein the first of the at least two tuning stubs connects to the first V-shaped region and the second of the at least two tuning stubs connects to the second V-shaped region.

23. The RFID device of claim 21, wherein the first and second of the at least two tuning stubs connect to the first V-shaped region.

\* \* \* \* \*